Sept. 14, 1926.
A. N. NELSON
STRAINER
Filed Dec. 22, 1925
1,599,835
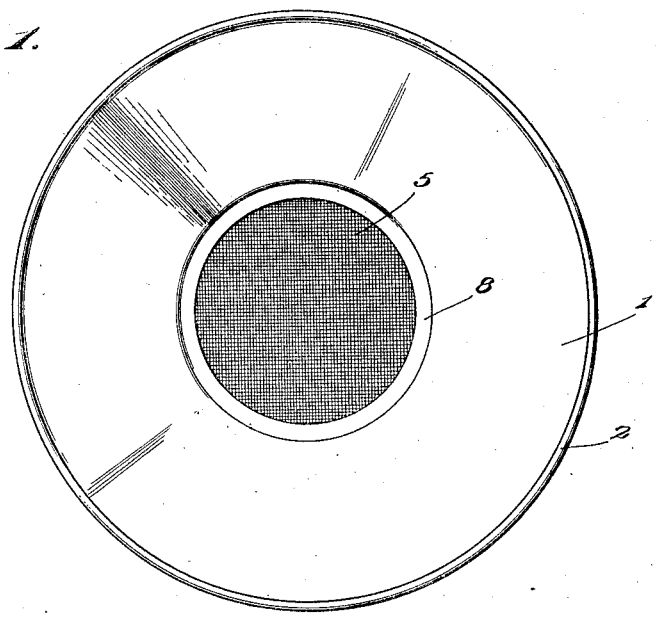
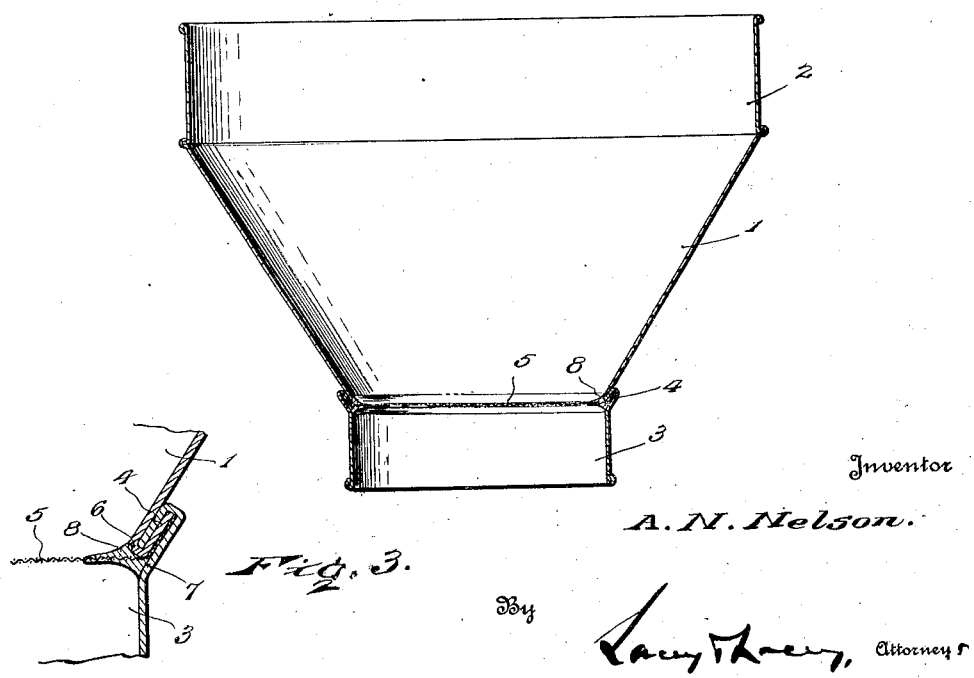
Inventor
A. N. Nelson.
By
Lacy Lacy, Attorneys Patented Sept. 14, 1926.

1,599,835

UNITED STATES PATENT OFFICE.

ALBIN N. NELSON, OF FREDERIC, WISCONSIN.

STRAINER.

Application filed December 22, 1925. Serial No. 77,050.

This invention relates to strainers and more particularly to a strainer of the type used in dairies and on farms for straining milk.

One object of the invention is to eliminate annular crevices above and below the screen at its junction with the body portion and outlet neck of the strainer and thereby prevent the accumulation of dried milk and foreign substances which would tend to make the strainer unsanitary.

Another object of the invention is to so apply solder employed as a means for filling the crevices that it will overlap the screen adjacent the body and outlet neck of the strainer and serve to reinforce the screen and prevent it from quickly tearing loose.

This invention is illustrated in the accompanying drawing, wherein—

Figure 1 is a top plan view of the improved strainer;

Fig. 2 is a vertical sectional view through the strainer, and

Fig. 3 is an enlarged fragmentary sectional view illustrating in detail the manner of applying solder to the strainer.

The body portion 1 of the strainer has been shown tapered downwardly and at its upper end joined to a curb portion 2. It will be understood, however, that the specific shape of the body portion is not essential and that this may be varied and also that the curb 2 may be omitted if so desired. The body 1 is open at its lower end and is joined to a discharge neck 3 by means of a folded joint 4 disposed externally of the body and neck, as clearly shown in Fig. 3. The screen 5 is formed of wire and has its marginal portions disposed in the joint 4 before the joint is folded upwardly against the outer face of the body. It will be readily understood that when the joint is folded upwardly and pressed tightly against the body the screen will be stretched and held firmly in place. By referring to Fig. 3, it will be noted that at the junction of the screen with the body 1 and upper end of the neck 3 there are annularly extending crevices 6 and 7 in which dried milk and foreign substances would tend to gather and thereby make the strainer unsanitary. In order to eliminate the crevices 6 and 7, there has been provided solder 8 which is applied to the strainer in the usual manner by means of a soldering iron. The solder when applied flows into the crevices 6 and 7 and also flows upon the adjacent portions of the screen and completely fills the crevices and wire mesh. The solder tapers towards the center of the screen and, therefore, merges into the upper and lower surfaces thereof so that milk poured into the strainer will be directed through the screen and no crevices will be left in which dried milk and impure substances may gather. It will, therefore, be seen that the strainer will be very sanitary and may be easily cleaned after use by running hot water through it.

Having thus described the invention, I claim:—

1. A strainer comprising a body open at its lower end, an outlet neck joined to said body about its open lower end, screening extending across the outlet of said body and having its marginal portions secured at the junction of the body and neck, and a fused bond applied to the inner faces of said neck and body adjacent their connection with each other and extending in lapped relation to said screen to reinforce the screen and fill crevices at the junction of the screen with the body and neck.

2. A strainer comprising a body open at its lower end, an outlet neck disposed about the open lower end of said body and folded into engagement therewith to provide a seam connection between the body and neck, screening extending across the open lower end of said body with its marginal portions secured in said folded seam, and solder applied in a melted condition to the inner faces of said body and neck adjacent their junction with said screen and extending in lapped relation to the screen to reinforce the screen and fill crevices at the junction of the body and neck with the screen.

In testimony whereof I affix my signature.

ALBIN N. NELSON. [L. S.]